(12) United States Patent
Dieterle et al.

(10) Patent No.: US 7,448,242 B2
(45) Date of Patent: Nov. 11, 2008

(54) METHOD FOR SECURING A MACHINE TOOL AND OPTO-ELECTRONIC SENSOR FOR CARRYING OUT SUCH A METHOD

(75) Inventors: Gerhard Dieterle, Simonswald (DE); Ingolf Braune, Gundelfingen (DE)

(73) Assignee: Sick AG, Waldkirch (DE)

( * ) Notice: Subject to any disclaimer, the term of this patent is extended or adjusted under 35 U.S.C. 154(b) by 398 days.

(21) Appl. No.: 11/111,214

(22) Filed: Apr. 21, 2005

(65) Prior Publication Data

US 2005/0235790 A1    Oct. 27, 2005

(30) Foreign Application Priority Data

Apr. 23, 2004   (DE) ................. 10 2004 020 024

(51) Int. Cl.
*B21D 55/00* (2006.01)
*F16D 13/14* (2006.01)

(52) U.S. Cl. ............... 72/21.1; 72/21.3; 72/28.1; 72/389.3; 100/348; 192/130; 250/221; 250/222.1; 250/559.12; 340/555

(58) Field of Classification Search .......... 72/21.1, 72/21.3, 28.1, 389.3, 389.6; 100/342, 248; 192/129 A, 130; 250/221, 222.1, 559.12, 250/559.13; 340/555
See application file for complete search history.

(56) References Cited

U.S. PATENT DOCUMENTS

| | | | | |
|---|---|---|---|---|
| 4,166,369 A | * | 9/1979 | Nakajima | .............. 72/21.1 |
| 4,249,074 A | * | 2/1981 | Zettler et al. | ............. 250/221 |
| 4,660,703 A | * | 4/1987 | Filcich et al. | ............ 192/130 |
| 4,772,801 A | * | 9/1988 | Fornerod et al. | ....... 250/559.13 |
| 4,907,432 A | | 3/1990 | Maillefer | |
| 5,579,884 A | * | 12/1996 | Appleyard et al. | ......... 192/130 |
| 6,389,860 B1 | * | 5/2002 | Stalzer | .................. 72/1 |

(Continued)

FOREIGN PATENT DOCUMENTS

DE    44 22 497 C2    6/1996

(Continued)

OTHER PUBLICATIONS

Multing, Blanking and Co.: In: elektro Automation, 2002, issue 4, p. 24.

*Primary Examiner*—David B Jones
(74) *Attorney, Agent, or Firm*—Harness, Dickey & Pierce, P.L.C.

(57) ABSTRACT

The invention relates to a method for securing a machine tool comprising a first tool part that carries out work movements in the direction of a second tool part in order thereby to carry out a machining process on a workpiece, wherein an optoelectronic sensor monitors a three-dimensional protected field between the tool parts in that light is transmitted along an open gap formed between the tool parts by means of a transmitter device and is detected by means of a receiver device which includes a matrix of light-sensitive elements, wherein the first tool part is stopped if individual light-sensitive elements or specific groups of the light-sensitive elements do not receive any light. In the method in accordance with the invention, relative positions between individual workpiece areas or measured values related to individual workpiece areas are determined from the signals delivered by the light-sensitive elements. The invention furthermore relates to an optoelectronic sensor by means of which the named method can be carried out.

18 Claims, 2 Drawing Sheets

U.S. PATENT DOCUMENTS

| | | |
|---|---|---|
| 6,536,559 B1 | 3/2003 | Siegler |
| 6,549,648 B1 | 4/2003 | Rinn |
| 6,660,993 B2 * | 12/2003 | Appleyard et al. .......... 250/221 |
| 6,677,574 B2 * | 1/2004 | Fiessler ...................... 250/221 |
| 6,752,253 B2 * | 6/2004 | Fiessler ...................... 192/130 |
| 6,919,554 B2 * | 7/2005 | Braune et al. ............... 250/221 |
| 6,919,555 B2 * | 7/2005 | Fiessler ...................... 250/221 |
| 7,080,534 B2 * | 7/2006 | Schneiderheinze .......... 72/21.3 |
| 2003/0062469 A1 | 4/2003 | Braune et al. |

FOREIGN PATENT DOCUMENTS

| | | |
|---|---|---|
| DE | 198 25 829 | 12/1999 |
| DE | 198 28 000 C2 | 6/2000 |
| DE | 199 38 639 | 2/2001 |
| DE | 100 00 287 A1 | 7/2001 |
| DE | 20102192 U1 | 7/2001 |
| DE | 101 14 784 A1 | 10/2002 |
| DE | 101 43 505 A1 | 3/2003 |
| DE | 101 52 543 A1 | 5/2003 |
| EP | 0 166 351 | 1/1986 |
| JP | 03-140698 | 6/1991 |
| JP | 10-227394 | 8/1999 |
| WO | 03/104711 A1 | 12/2003 |

* cited by examiner

METHOD FOR SECURING A MACHINE TOOL AND OPTO-ELECTRONIC SENSOR FOR CARRYING OUT SUCH A METHOD

CROSS-REFERENCE TO RELATED APPLICATIONS

This application claims the benefit of German Application No. 102004020024.6 filed Apr. 23, 2004. The disclosure of the above application is incorporated herein by reference.

FIELD OF THE INVENTION

The invention relates to methods for securing a machine tool apparatus to minimize operator injury.

BACKGROUND OF THE INVENTION

The invention relates to a method for securing a machine tool comprising a first tool part that carries out work movements in the direction of a second tool part in order thereby to carry out a machining process on a workpiece, wherein an optoelectronic sensor monitors a three-dimensional protected field between the tool parts in that light is transmitted along an open gap formed between the tool parts by means of a transmitter device and is detected by means of a receiver device which includes a matrix of light-sensitive elements, wherein the first tool part is stopped if individual light-sensitive elements or specific groups of the light-sensitive elements do not receive any light. The invention furthermore relates to an optoelectronic sensor for carrying out such a method.

The named machine tool is typically a stamping press for the bending, folding, cutting or stamping of workpieces such as sheet metal parts. The named first tool part is formed in this case by a top tool which has a longitudinal bending line or cutting edge. This top tool is moved, during its working movement, vertically downwardly toward a bottom tool which serves as a second tool part and which the workpiece contacts or lies on.

For each machining process, the previously machined workpiece must first be removed and the new workpiece to be machined must be introduced into the open gap between the tool parts. This is done manually by an operator as a rule. To avoid an injury to the operator, in particular to his hands, by a dangerous movement of a part of the machine tool during the closing of the open gap, the optoelectronic sensor monitors a protected field which typically extends beneath the moved top tool. This protected field is three-dimensional, i.e. at least its outline extends along a two-dimensional cross-section such that the sensor can react fast and reliably to dangerous intrusions from different directions and can trigger a stopping of the dangerous movement.

In addition to the named optoelectronic sensor, separate measuring devices are frequently provided in machine tools known from the prior art which are suitable for a measurement of the machined workpiece. It can, for example, be determined by means of such measuring devices whether a machining process was carried out correctly and without error on a workpiece.

SUMMARY OF THE INVENTION

An object of the invention consists of providing a method of the initially named kind and an optoelectronic sensor for carrying out such a method which can also satisfy additional functions in addition to a securing of the danger zone of a machine tool with an economic effort which is as low as possible.

This object is satisfied using a method in accordance with the invention in accordance with claim 1 and in particular in that relative positions between individual workpiece areas or tool areas or measured values related to individual workpiece areas or tool areas are determined from the signals delivered by the light-sensitive elements. The named object is furthermore satisfied by an optoelectronic sensor in accordance with the invention in accordance with claim 10 whose evaluation and control unit is not only designed to stop the machine tool on the occurrence of dangers, but is additionally also designed for the determination of relative positions between individual workpiece areas or tool areas or of measured values related to individual workpiece areas or tool areas, and indeed in dependence on the signals delivered by the light-sensitive elements.

In accordance with the invention, a single optoelectronic sensor comprising a transmitter device and a receiver device is therefore used both for securing a danger zone at a machine tool and for a measurement of the workpiece so that the provision of a separate measuring device associated with additional costs, which is required in accordance with the prior art, can be saved. An increased economy in carrying out the initially named method thus results from the named dual function of the optoelectronic sensor.

The circumstance is of particular advantage in accordance with the invention that not only a workpiece can be measured, but also a tool used in the respective machine tool. It can be checked by such a measurement whether the correct respective tool was clamped in, in particular whether the top tool and the bottom tool match one another. In this manner, accidents can be avoided which can occur when the top tool and the bottom tool do not match one another, for example when a top tool breaks a non-matching bottom tool.

If it is therefore found in accordance with the invention that top tools and bottom tools were used which do not match one another, this can automatically trigger an alarm signal or a stopping of the machine.

The fact is furthermore advantageous on the use of the method in accordance with the invention that a relatively precise measurement of workpiece areas or of tool areas or a comparatively precise determination of the silhouette of workpiece areas or of tool areas can take place by the evaluation of the signals delivered by the light-sensitive elements. It can thus not only be determined by means of the optoelectronic sensor whether the shape of the machined workpiece is within pre-determined, comparatively rough tolerances, but a precise determination of the shape of the workpiece to be measured or of the measured workpiece areas or tool areas can rather take place. It thereby becomes possible, for example with stamping presses for the bending of workpieces, to check after the end of the bending process whether the generated bending angle corresponds to a pre-determined desired value. In addition to a securing of the machine tool and to a check of the respective tool used, an exact check of a machining process which has been carried out can also take place with the optoelectronic sensor used in accordance with the invention.

Different processes can be triggered in dependence on the measured values determined or on the relative positions between individual workpiece areas. It is, for example, possible to act on a signal device which indicates whether a machining process on a workpiece was carried out correctly. A classification of a machined workpiece, e.g. with respect to the quality of the machining which has taken place, can likewise take place. It is moreover possible in a particularly preferred variant of the method to carry out a continuation of a machining process or also a new machining process on a workpiece to be measured in dependence on the determined measured values or relative positions in order, for example, to improve the result of an insufficient machining process. If it is therefore found, for example, with a stamping press for the bending of a workpiece that the bending angle generated has not yet reached the required degree, the first tool part can again be moved so far in the direction of the second tool part that the desired bending angle is ultimately adopted. A corresponding check and rework can take place within the framework of each individual bending procedure so that it is not necessary to set the machine tool to a desired bending angle in advance by test series. The fine setting of the machine tool by means of test series required for the achieving of a precise bending angle in accordance with the prior art can rather be replaced by a control of the machine tool in dependence on the determined measured values or relative positions.

The relative positions or measured values in accordance with the invention can be determined before, during and/or after the machining process. The basic state of the workpiece to be machined can thus be determined using the optoelectronic sensor used in accordance with the invention before the machining procedure, the shape of the workpiece can be determined during different phases of the machining process and, finally, the shape of the workpiece can be determined after the end of the machining process. This permits an unbroken monitoring of the whole machining process, with it simultaneously being ensured that the respectively desired machining result is also actually achieved.

It is preferred when groups of adjacent light-sensitive elements of the optoelectronic sensor are defined as measuring windows and only the signals delivered by these measuring windows are used to determine the relative positions between the individual workpiece areas. In this manner, the signals delivered by all light-sensitive elements do not always have to be used for the evaluation. It is rather sufficient to position the measuring windows such that the areas of the workpiece relevant for the respective machining process can be monitored. It is particularly advantageous for the measuring windows to be able to be displaced within the matrix of the light-sensitive elements and/or for their sizes and/or their shapes to be changed during a machining process. It can thereby be ensured that those workpiece areas can always be observed which are relevant to the evaluation of the quality of the machining process even during the machining process in which a workpiece changes its shape. To achieve this, the named displacement or change of the measuring windows can take place in dependence on the already determined measured values or relative positions, on operating states of the machine tool and/or on inputs of an operator. It is in particular possible with a bending press to pre-set a displacement or change of the measuring windows by the program controlling the bending processes.

It is particularly preferred for areas of the workpiece with a straight-line contour to be determined by means of image processing algorithms from signals delivered by the light-sensitive elements and for the measuring windows to be placed in these areas. It is e.g. namely sufficient for the determination of the quality or of the result of a bending process for two workpiece areas, each with a straight-line contour, to be determined, for the measuring windows to be placed into these areas and for the bending angle between the two workpiece areas with a straight-line contour then to be determined.

In certain applications, in particular when the optoelectronic sensor is fixedly connected to an unmovable tool part, for example to the die of a bending machine, the measuring windows can be positioned in a fixed pre-determined relative position to the movable tool part in order thus to ensure that the measuring windows move along with the movable tool part despite the stationary arrangement of the optoelectronic sensor. A monitoring of the quality of the machining process can thus also be ensured during the whole machining time in these cases.

The transmitter device of an optoelectronic sensor in accordance with the invention is preferably designed to transmit a parallel light bundle which acts on the total matrix of the light-sensitive elements of the receiver device. The silhouette of workpiece areas can be precisely determined by the use of such a parallel light bundle which is preferably incident on the matrix of the light-sensitive elements.

It is of advantage for the optoelectronic sensor to be attached in a fixed relative position to the first tool part or to the second tool part at the machine tool itself. In particular on the attachment to the moved tool part, it can be ensured that, in addition to the measuring function in accordance with the invention, a sufficient securing of the danger zone directly adjoining the moved tool part is also always present. The evaluation and control unit of the optoelectronic sensor and its receiver device can be coupled to one another and can in particular be accommodated in a common housing.

It is furthermore advantageous for the evaluation and control unit to have data outputs for the transmission of switching-off signals which act on the machine tool and of data describing the determined relative positions or measured values.

Further preferred embodiments of the invention are mentioned in the dependent claims.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
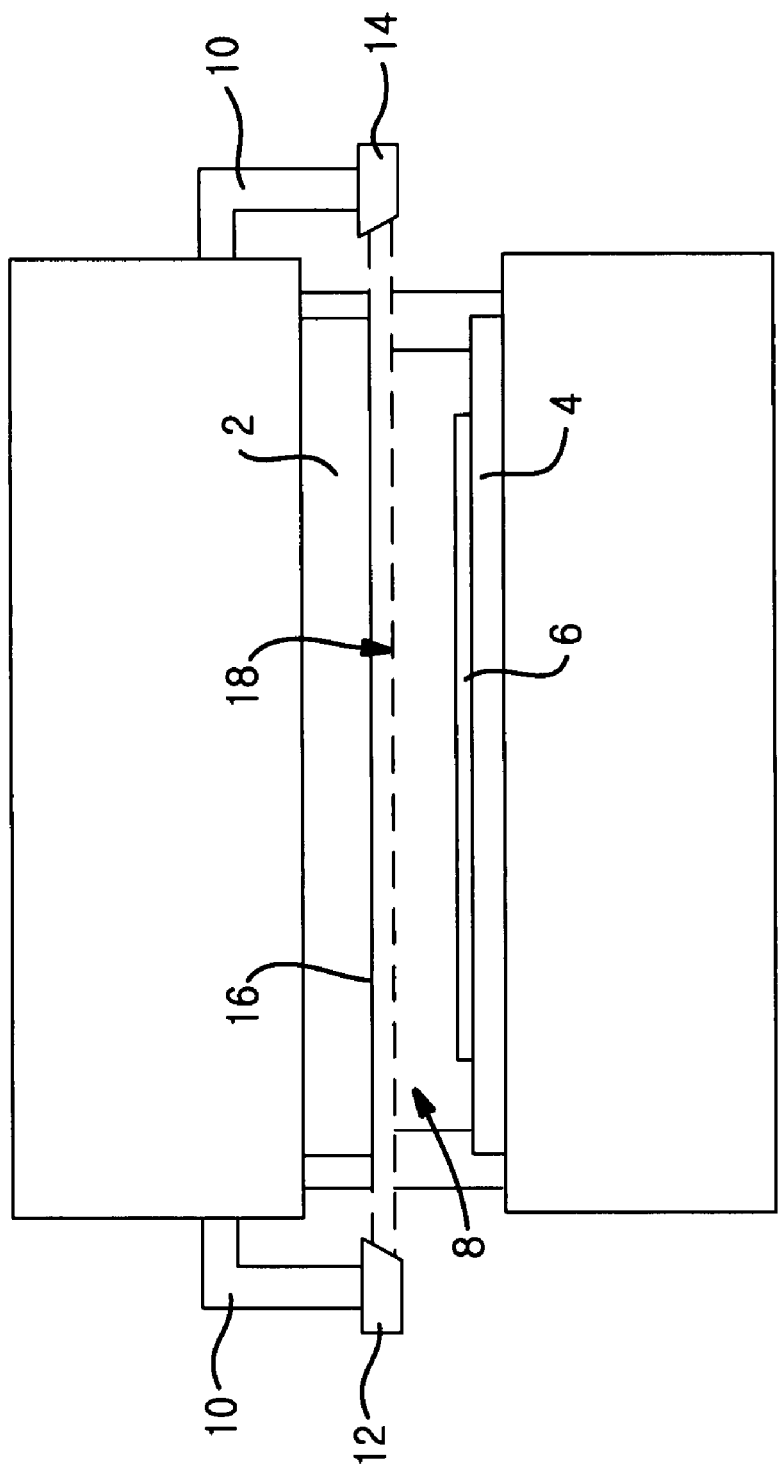
FIG. 1 shows a schematic front view of a stamping and bending press.

The stamping and bending press shown in FIG. 1 has a top tool or a pressing beam 2 which can be driven to make a work movement vertically downwardly toward a bottom tool 4 in order to bend a workpiece 6 lying on the bottom tool 4. An open gap 8 between the top tool 2 and the workpiece 6 is gradually closed during this work movement.

A respective holding arm 10 is provided at the two sides of the pressing beam 2. The holding arms 10 carry a transmitter device 12 and a spatially resolving receiver device 14 which are parts of an optoelectronic sensor and are aligned relative to the top tool 2. The transmitter device 12 has a light source made e.g. as an LED or laser diode with an optical transmitter device (not shown in the Figures) which expands the transmitted light of the light source into a light ray 16. In most applications of the invention, it is meaningful to expand the light ray 16 such that e.g. parts of the top tool 2 are also covered by the light ray 16 (see also FIGS. 2a, b). The receiver device 14 has a rectangular matrix receiver which is made e.g. in CMOS, CID, CCD technology or the like, is acted on by the light ray 16 and is dimensioned such that the light ray is incident on the receiver with its full cross-section.

The light ray 16 passes through the open gap 8 beneath the top tool 2. The outline of a correspondingly activated part of the receiver device 14 defines a three-dimensional protected field 18 within the light ray 16 between the top tool 2 and the bottom tool 4, as will be explained in the following in connection with FIGS. 2a and 2b. As soon as an evaluation and control device of the sensor (not shown in the Figures) detects an interruption of the light ray 16 inside the protected field 18, it triggers a switch-off process to stop the top tool 2. An operator, for example introducing the workpiece 6 into the open gap 8 and fixing it there, is thereby protected from injury by the top tool 2.

The functioning manner of the stamping and bending press of the invention in accordance with FIG. 1 which works with a light ray 16 which is more expanded with respect to FIG. 1 will be explained in the following with reference to FIGS. 2a and 2b.

Figure 2A:
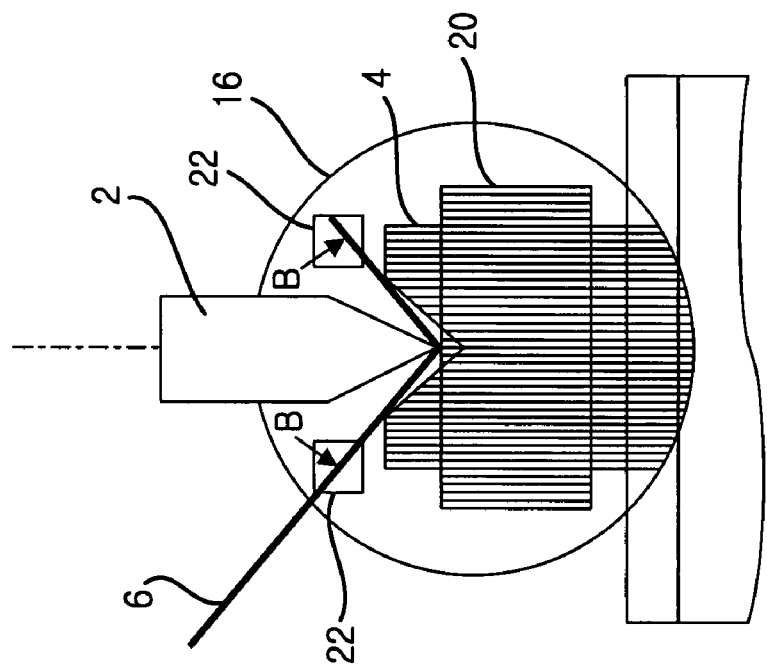
FIGS. 2a, b show respective schematic side views of parts of this stamping and bending press in different phases of a normal machining process.
Figure 2B:
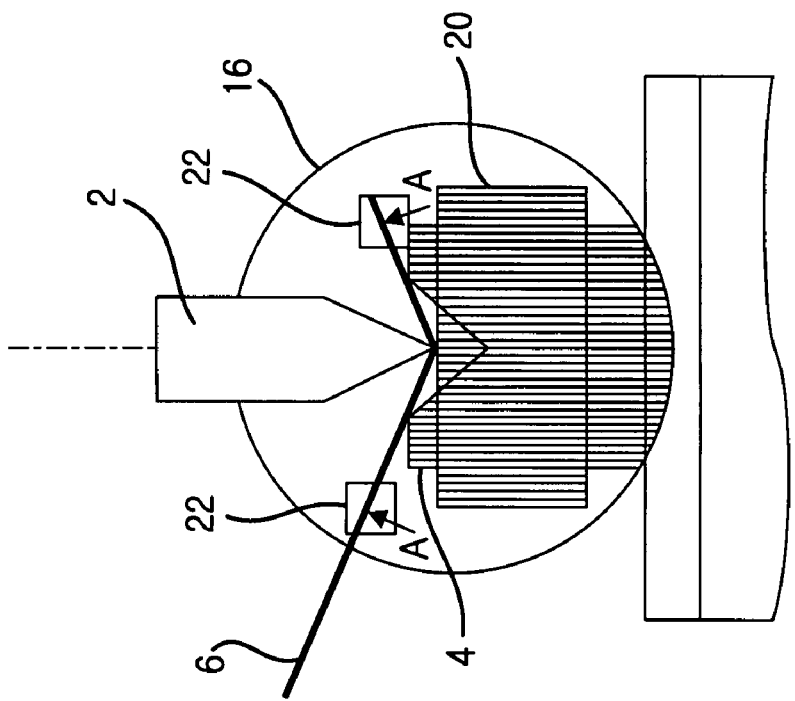

FIGS. 2a and 2b each show the top tool 2, the bottom tool 4, the workpiece 6 lying thereon and the light ray 16, which is circular in cross-section in a schematic side view.

The receiver device 14 with its receiver matrix is dimensioned such that the light ray 16 shown in FIGS. 2a and 2b is incident on the receiver device 14 with its full cross-section so that it can be detected by means of the receiver matrix whether the light path between the light transmitter 12 and the light receiver 14 is interrupted at any point of the light ray 16. In accordance with the invention, this information, which is delivered by the individual receiver elements of the receiver matrix, reaches an evaluation and control unit which processes this information in different manners.

Those receiver elements which are associated with the rectangular protected field 20 shown in FIGS. 2a and 2b and arranged beneath the top tool 2 deliver signals which always result in a switching off of the stamping and bending press when the light ray 16 is interrupted in a part zone corresponding to the protected field 20. The protected field 20 is arranged in a stationary manner inside the light ray 16 such that it is ensured that it is always located directly beneath the top tool 2 to which the optoelectronic sensor 12, 14 is attached.

In addition to the protected field 20, specific receiver elements of the receiver device 14 are defined as measuring windows 22 of which two respective pieces are shown by way of example in FIGS. 2a and 2b. The signals delivered by the measuring windows 22 have no meaning with respect to the explained switch-off function and are only used for a measurement of the machined workpiece 6.

In order to determine the position of the measuring windows 22, all signals delivered by the receiver device 14 are processed by means of suitable image processing algorithms such that areas of the workpiece 6 which generate a silhouette with a straight contour on the receiver device 14 are recognized. The measuring windows 22 are thereupon displaced into those areas of the receiver device 14 on which such silhouette areas with a preferably straight contour are imaged.

The shape of the silhouette of the workpiece 6 can thus be determined in the region of the measuring windows. It is likewise possible, for example, to determine the extent of the lower side of the workpiece 6 (see arrows A in accordance with FIG. 2a) or the extent of the upper side of the workpiece 6 (see arrows B in FIG. 2b) within the measuring windows 22.

The bending angle of the workpiece 6 instantaneously generated by the stamping and bending press can then be determined from the determined extents of the upper side, lower side or silhouette by a processing of the signals of the two measuring windows 22.

It becomes possible by a constant check of the signals delivered by the receiver device 14 as to where silhouette regions of the workpiece 6 with a preferably straight contour are just located to allow the measuring windows 22 to "migrate along" as the bending process proceeds so that the position of the measuring windows 22 changes in different phases of the bending process, as is illustrated by FIGS. 2a and 2b. In FIG. 2b, the bending process is further advanced than in FIG. 2a. It can, however, be determined in both cases by the respectively adapted position of the measuring windows 22 which bending angle is currently present at the workpiece 6.

In accordance with the invention, a measurement of the workpiece 6 via the measuring windows 22 and the switch-off function via the protected field 20 can take place either simultaneously or alternately.

REFERENCE NUMERAL LIST 2 top tool
4 bottom tool
6 workpiece
8 open gap
10 holding arms
12 transmitter device
14 receiver device
16 light ray
18 protected field
20 protected field
22 measuring window The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of operating a machine tool having a first tool part that carries out work movements in a direction of a second tool part in order thereby to carry out a machining process on a workpiece, comprising:
    monitoring a three-dimensional protected field between the tool parts using an optoelectric sensor in that light is transmitted along an open gap formed between the tool parts by means of a transmitter device and is detected by means of a receiver device which includes a two-dimensional matrix of light-sensitive elements,
    stopping the first tool part if individual light-sensitive elements or specific groups of the light-sensitive elements do not receive any light; and
    determining relative positions between individual workpiece areas or tool areas from signals delivered by the light-sensitive elements.

2. A method in accordance with claim 1, wherein based upon a dependence on the determined relative positions, at least one of the following applies:
    (a) a machining process takes place on a workpiece or a control of the machine tool takes place;
    (b) a signal device is acted on;
    (c) a classification of the machined workpiece takes place;
    (d) a classification of a tool takes place.

3. A method in accordance with claim 1, wherein the relative positions are determined before, during and/or after the machining process.

4. A method of operating a machine tool having a first tool part that carries out work movements in a direction of a second tool part in order thereby to carry out a machining process on a workpiece, comprising:
- monitoring a three-dimensional protected field between the tool parts using an optoelectric sensor in that light is transmitted along an open gap formed between the tool parts by means of a transmitter device and is detected by means of a receiver device which includes a two-dimensional matrix of light-sensitive elements,
- stopping the first tool part if individual light-sensitive elements or specific groups of the light-sensitive elements do not receive any light;
- determining relative positions between individual workpiece areas or tool areas or measured values related to individual workpiece areas or tool areas from signals delivered by the light-sensitive elements; and
- determining a silhouette of workpieces or tools by the evaluation of the signals delivered by the light-sensitive elements.

5. A method in accordance with claim 4, characterized in that, in dependence on the determined relative positions or measured values, a machine process takes place on a workpiece or a control of the machine tool takes place; a signal device is acted on; a classification of the machined workpiece takes place; or a classification of a tool takes place.

6. A method of operating a machine tool having a first tool part that carries out work movements in a direction of a second tool part in order thereby to carry out a machining process on a workpiece, comprising:
- monitoring a three-dimensional protected field between the tool parts using an optoelectric sensor in that light is transmitted along an open gap formed between the tool parts by means of a transmitter device and is detected by means of a receiver device which includes a two-dimensional matrix of light-sensitive elements,
- stopping the first tool part if individual light-sensitive elements or specific groups of the light-sensitive elements do not receive any light; and
- determining relative positions between individual workpiece areas or tool areas or measured values related to individual workpiece areas or tool areas from signals delivered by the light-sensitive elements, wherein groups of adjacent light-sensitive elements form measuring windows and only the signals delivered by these measuring windows are used to determine the relative positions.

7. A method in accordance with claim 6, wherein at least one of size, shape or location of the measuring windows are changed during a machining process.

8. A method in accordance with claim 7, wherein changes to the measuring windows takes place in dependence on the determined relative positions or measured values, on operating states of the machine tool and/or on inputs of an operator.

9. A method in accordance with claim 6, wherein the measuring windows are aligned with areas of the workpiece with a straight-line contour as determined by means of image processing algorithms.

10. A method in accordance with claim 6, wherein the measuring windows are positioned in a fixed position relative to the first tool part.

11. A method in accordance with claim 6, characterized in that, in dependence n the determined relative positions or measured values; a machining process takes place on a workpiece or a control of the machine tool takes place; a signal device is acted on; a classification of the machined workpiece takes place; or a classification of a tool takes place.

12. An optoelectronic sensor as a protective device for determining safety conditions of a machine tool having a first tool part for carrying out work movements in a direction of a second tool part in order thereby to carry out a machining process on a workpiece, comprising:
- a transmitter device for the monitoring of a three-dimensional protected field between the tool parts and for the transmission of light along an open gap formed between the tool parts;
- a receiver device including a two-dimensional matrix of light-sensitive elements for the detection of the transmitted light, and
- an evaluation and control unit to stop the first tool part when individual light-sensitive elements or specific groups of the light-sensitive elements do not receive any light; and wherein the evaluation and control unit is additionally designed for the determination of relative positions between individual workpiece areas or tool areas, in dependence on signals delivered by the light-sensitive elements.

13. An optoelectronic sensor in accordance with claim 12, wherein the transmitter device is designed for the transmission of a parallel light bundle.

14. An optoelectronic sensor in accordance with claim 12, that is attached in a fixed relative position to the first tool part or to the second tool part at the machine tool.

15. An optoelectronic sensor in accordance with claim 12 wherein the evaluation and control unit and the receiver device are coupled to one another.

16. An optoelectronic sensor in accordance with claim 12 wherein the evaluation and control unit and the receiver device are accommodated in a common housing.

17. An optoelectronic sensor in accordance with claim 12, wherein the evaluation and control unit has data outputs for the transmission of switching-off signals and of data describing the determined relative positions or measured values.

18. An optoelectronic sensor in accordance with claim 12, wherein the machine tool is made as any one of a stamping press, a folding press, a bending machine, a cutting machine and a stamping machine.

* * * * *